United States Patent
Le Paih (10) Patent No.: US 7,819,726 B2
(45) Date of Patent: Oct. 26, 2010

(54) ROTARY PISTON PUMP

(75) Inventor: Jacques Le Paih, Plumeliau (FR)

(73) Assignee: Stork Food Systems France, Baud (FR)

( * ) Notice: Subject to any disclaimer, the term of this patent is extended or adjusted under 35 U.S.C. 154(b) by 366 days.

(21) Appl. No.: 11/911,147

(22) PCT Filed: Mar. 13, 2006

(86) PCT No.: PCT/FR2006/000545

§ 371 (c)(1),
(2), (4) Date: Oct. 10, 2007

(87) PCT Pub. No.: WO2006/108935

PCT Pub. Date: Oct. 19, 2006

(65) Prior Publication Data

US 2008/0175725 A1 Jul. 24, 2008

(30) Foreign Application Priority Data

Apr. 11, 2005 (FR) .................................. 05 03554

(51) Int. Cl.
*A22C 11/00* (2006.01)
(52) U.S. Cl. ..................................................... 452/141
(58) Field of Classification Search ............ 452/40–42, 452/30–32, 46–48, 21–26, 35–37
See application file for complete search history.

(56) References Cited

U.S. PATENT DOCUMENTS

| | | | |
|---|---|---|---|
| 3,922,755 A | 12/1975 | Righele et al. | |
| 4,821,377 A | 4/1989 | Valiani | |
| 5,197,917 A * | 3/1993 | Verbakel et al. | ............. 452/131 |
| 6,309,293 B1 * | 10/2001 | Zinser et al. | ................... 452/41 |
| 6,645,917 B2 * | 11/2003 | Mahajan et al. | ............. 504/238 |
| 7,220,176 B2 * | 5/2007 | Hartwick | ...................... 452/30 |
| 7,500,909 B2 * | 3/2009 | Maile | .......................... 452/41 |

FOREIGN PATENT DOCUMENTS

| | | |
|---|---|---|
| FR | 1325528 | 4/1963 |
| FR | 2127764 | 10/1972 |
| GB | 1480683 | 7/1977 |

* cited by examiner

*Primary Examiner*—Thomas Price (57) ABSTRACT

A rotary piston pump includes a stator defining a cylindrical cavity, a rotor or barrel housed in said cylindrical cavity, able to be driven in rotation by a motor. The rotor includes an array of bores spaced circumferentially wherein pistons are mounted. The pump has a mechanical cam cooperating with the pistons in order to provoke movement of said pistons between a low position and a high position, a lid closing the cylindrical cavity, a feeding orifice coming into communication with at least one cylindrical chamber, a hopper, a discharging orifice simultaneously in communication with at least two consecutive chambers, and vacuuming means for vacuuming cylindrical chambers for filling. The vacuuming means includes at least one vacuuming channel connecting to the lower part of each cylindrical chamber able to vacuum by the bottom each chamber by the vacuuming channel therewith when the piston associated therewith is in lower position.

11 Claims, 7 Drawing Sheets

ROTARY PISTON PUMP

BACKGROUND OF THE INVENTION

This invention relates to a rotary piston pump for semi-solid products. This invention relates more particularly to a rotary piston pump for minced meat, in particular for producing sausages or the portioning of minced meat comprising large pieces of muscle.

In the field of producing sausages, piston pumps are known in the art comprising a stator defining a cylindrical cavity, a rotor or barrel housed in said cylindrical cavity, able to be driven in rotation by the shaft of a motor, said rotor comprising an array of bores positioned axially and spaced circumferentially, wherein are mounted pistons, a mechanical cam cooperating with the pistons in order to provoke an alternating back and forth movement of said pistons between a low position and a high position during the rotation of the barrel, a lid closing the cylindrical cavity and comprising a feeding orifice coming into communication with at least one cylindrical chamber formed by the barrel cylindrical bore and a piston associated therewith, and intended to be in communication with a hopper, and a discharging orifice able to come simultaneously into communication with at least two consecutive cylindrical chambers. In order to facilitate the filling of the cylindrical chambers, it is known in the art to apply a vacuum from the top in the cylindrical chambers, when the pistons are in low position, by the intermediary of a vacuuming orifice provided on the lid. In pumps of similar design, the pistons are housed in radial chambers and the feeding and discharging orifices are formed on the stator.

The minced meat output from such pumps maintains its qualities. However, such pumps do not make it possible to obtain at the output a constant flow of products, despite various adjustments made to the form of the discharging orifice and of the mechanical cam. The weight of the sausages obtained with these pumps can vary by 10 to 15% in relation to the desired average weight. In order to be sold, it is necessary to guarantee a substantially constant unit weight corresponding to the announced weight. The producer is therefore obliged to increase the desired average weight in order to be sure that the announced weight is reached. These pumps therefore are not widely used today due to the considerable loss of products for the producer.

Vane pumps have been proposed as a replacement for these piston pumps. Such vane pumps provide a substantially constant flow. However, the meat undergoes major flaking and high pressure which results in heating the meat and the fat of the meat thus heated tends to spread out. At pump output, the meat is completely denatured and has a whitish aspect.

The purpose of this invention is to overcome the aforementioned drawbacks by proposing a pump that provides a substantially constant flow at output, while still preserving the quality of the minced meat.

SUMMARY OF THE INVENTION

With this aim, the purpose of this invention is a rotary piston pump for semi-solid products, in particular for minced meat, comprising a stator defining a cylindrical cavity,
a rotor or barrel housed in said cylindrical cavity, able to be driven in rotation by a motor, said rotor comprising an array of bores spaced circumferentially, for example in the number of six, wherein pistons are mounted,
a mechanical cam cooperating with the pistons in order to provoke during the rotation of the barrel an alternating back and forth movement of said pistons between a low position and a high position,
a lid closing the cylindrical cavity,
a feeding orifice coming into communication with at least one cylindrical chamber formed by a barrel cylindrical bore and its associated piston, and intended to be in communication with a hopper,
a discharging orifice able to come simultaneously in communication with at least two consecutive cylindrical chambers, and
vacuuming means for vacuuming cylindrical chambers for filling thereof,
characterised in that said vacuuming means include at least one vacuuming channel connecting to the lower part of each cylindrical chamber, said vacuuming means being able to vacuum from the bottom each cylindrical chamber by the vacuuming channel when the piston associated therewith is in low position.

This invention proposes therefore to perform suction from the bottom in the cylindrical chambers when they are filled. Indeed, the applicant has noticed that with pumps of prior art the chambers were not filled uniformly, with empty spaces able to remain in the lower part of the chamber, between the meat and the upper side of the piston, which would alter the flow of the pump. The meat falling into the chamber at the beginning of filling, forms domes under which empty spaces remain, with the presence of means of suction from the top not making it possible to remove these empty spaces. The fact of providing according to the invention vacuuming means for vacuuming from the bottom of the chambers makes it possible to obtain a substantially constant flow of semi-solid product from the pump, said flow of the pump corresponding at least in part to the cumulative flows of the pistons of two consecutive cylindrical chambers in front of the discharging orifice.

According to a particularity, said vacuuming means are able to stop the vacuuming of each cylindrical chamber by the vacuuming channel therewith prior to the movement of said cylindrical chamber opposite the discharging orifice.

According to an embodiment, each cylindrical chamber includes at least one vacuuming channel formed on the cylindrical wall of the bore.

Advantageously, each vacuuming channel can be formed by a vertical groove made on the cylindrical wall of the bore, for example of generally semi-circular section, said groove extending from the lower side of the barrel over a height that is sufficient to connect to the cylindrical chamber when the piston is in low position, said vacuuming means being able to vacuum the lower chamber of the stator on which said vertical grooves connect.

According to an embodiment, each piston is able to be moved by the mechanical cam from its low position to an intermediary low position wherein the piston blocks off said vacuuming channel(s), with the movement being carried out upstream from the discharging orifice, more preferably when said piston is located at least partially opposite the feeding orifice.

Advantageously, each cylindrical chamber includes at least two vacuuming channels, for example three, distributed at a regular angular interval, on the cylindrical wall of the bore in the case with said aforementioned vertical grooves.

According to another particularity, each piston includes a piston head connected to a piston rod, said head containing a body covered with a packing made from a material having sliding properties, more preferably of foodstuff quality, by inserting between the body and said packing an intermediary layer having elastic properties, said packing forming a sealing surface through which the piston comes into sliding contact, is a substantially sealed manner, against the cylindrical wall of the bore.

According to another particularity, the vacuuming means further comprise a vacuuming orifice for vacuuming the chambers from the top, said pump comprising more preferably a vacuum pump system to which are connected the vacuuming channels of the cylindrical chambers, as well as said vacuuming orifice.

According to an embodiment, the cylindrical chambers of the rotor are positioned axially, with the pistons being able to be moved in parallel to the axis of rotation of the barrel, said lid being equipped with said feeding and discharging orifices, as well as a possible vacuuming orifice. The pump can also be equipped with a feeding hopper. Advantageously, the hopper includes a propeller feeding device driven by the drive motor of the barrel.

Furthermore the applicant has noticed that with pumps of prior art, the pieces of muscles that protrude from the upper part of the chamber are sometimes drawn outside of the chamber when the barrel is rotated, by the upstream end of the feeding orifice, or are torn off with a part of the piece that is removed from the chamber. So, in the case of minced meat comprising large pieces of muscle, the filling of the chambers is not uniform, which also alters the flow of the pump.

According to a particularity, the pump according to the invention includes cutting means, comprising a blade positioned along the downstream edge of the feeding orifice, for cutting the pieces of the products protruding from the cylindrical chambers during their passage beyond the feeding orifice. The purpose of this invention is also a pump equipped with such means of cutting, with or without the vacuuming means from the bottom described previously.

BRIEF DESCRIPTION OF THE DRAWINGS

The invention shall be better understood, and other purposes, details, characteristics and advantages shall appear more clearly during the detailed explanatory description which shall follow of a currently preferred particular embodiment of the invention, in reference to the annexed schematic drawing, in which.

DETAILED DESCRIPTION OF A PREFERRED EMBODIMENT OF THE INVENTION

Figure 1:
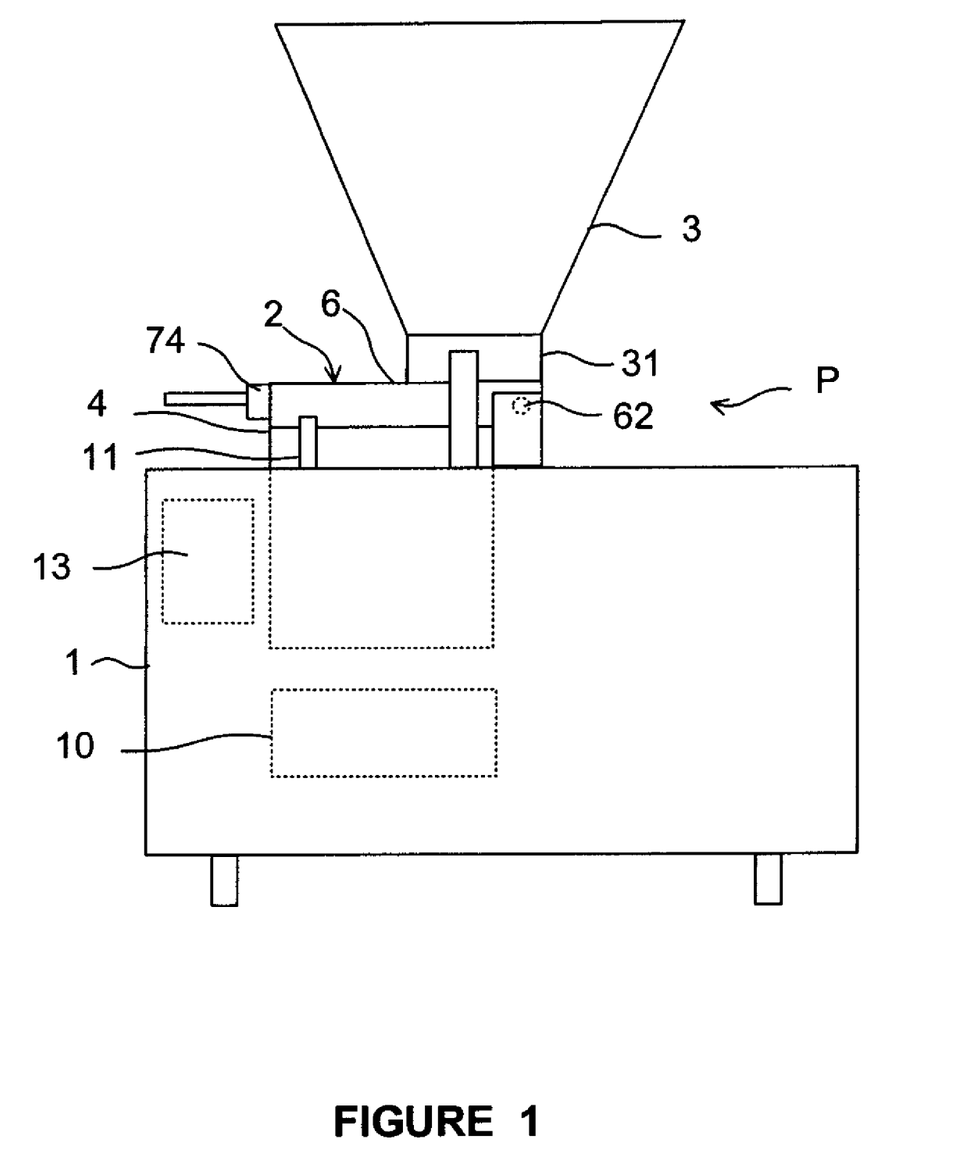
FIG. 1 shows a side view of a stuffer equipped with a piston pump according to the invention.

FIG. 1 shows a device commonly referred to as a stuffer P comprising a support chassis 1 on which is mounted a rotary piston pump 2 fed by hopper 3. According to FIGS. 1 and 2, piston pump 2 includes in a traditional way a stator or casing 4 defining a cylindrical cavity closed by an upper lid 6. A rotor or annular barrel 5 is mounted in the cylindrical cavity fixed in rotation around an axial shaft 10a driven in rotation in a clockwise direction by a motor 10 positioned in chassis 1. Motor 10 is for example a motor of the type without brushes, traditionally referred to as a "brushless" motor, controlled by a programmed speed variator. The barrel includes six bores 51 axially positioned and spaced circumferentially around shaft 10a, wherein are housed pistons 9, with six pistons being referenced as 91 to 96 in FIG. 3.

In a manner known to the art, a mechanical cam cooperates with the lower ends of the pistons opposite to the lid, in order to provoke the alternating movement of the pistons in the bores between a low position and a high position. A description of the movement by the mechanical cam of the pistons over one tour shall be carried out in reference to FIG. 3. The angular positions of the pistons in relation to stator 4 referenced A to F in FIG. 3 correspond to particular positions of the pistons in their bore. In angular position A, the piston is in lower position. The barrel being driven in a clockwise direction, such as shown by arrow referenced F, the pistons are maintained in this low position over approximately 60° until angular position B. The pistons are then brought to an intermediary low position to angular position C, positioned at approximately 30° from angular position B, and are maintained on approximately 30° in this intermediary low position until angular position D, diametrically opposite to angular position A. The pistons are therefore in their ascending discharge phase on approximately 90° from position D until angular position E. In position E, the pistons are in high position, with their upper side 9a flushing substantially the upper side 5a of the barrel on which the bores connect. The pistons are maintained in this high position over approximately 60° until position F. The pistons are then in their descending phase over approximately 30° from position F until position A, wherein the pistons are in low position. FIG. 4 shows a partial cross-section longitudinal view of the barrel in FIG. 3, after a rotation of approximately 50°, with piston 93 in intermediary low position, piston 94 in low position.

Lid 6 is constituted of a circular plate 61 mounted pivoting on chassis 1 around horizontal axis 62. The lid can be moved between an open position, shown in FIG. 2, and a closed position, shown in FIG. 1, wherein the lid is in sliding contact by its so-called internal side 61a with the upper side 5a of the barrel. The movement of the lid between these two positions is realised by a motorised system 16. The maintaining of the lid in closed position is provided by means of assembly 11, 12. The cylindrical wall of each bore defines a cylindrical chamber 8 (FIG. 4) delimited on one side by the lid and on the other side by the upper side 9a of the piston which slides in a substantially sealed manner between its low position and its high position in the bore.

Internal side 61a of the lid has a feeding orifice 63, a discharging orifice 64 and vacuuming orifice 65.

Feeding orifice 63 is in communication via a feeding channel 66 with the output of hopper 3 assembled on the external side of the lid, and is positioned so as to come opposite a cylindrical chamber containing a piston in its low position. This feeding orifice, of dimensions that are slightly greater than the diameter of the cylindrical chambers, has an oval form and is for example centred opposite a piston in the aforementioned angular position B. Hopper 3 includes a propeller feeding system 31 (FIG. 1) drawn into rotation in the closed position of the lid by aforementioned motor 10 serving to drive the barrel, by the intermediary of a transmission shaft 67.

Figure 2:
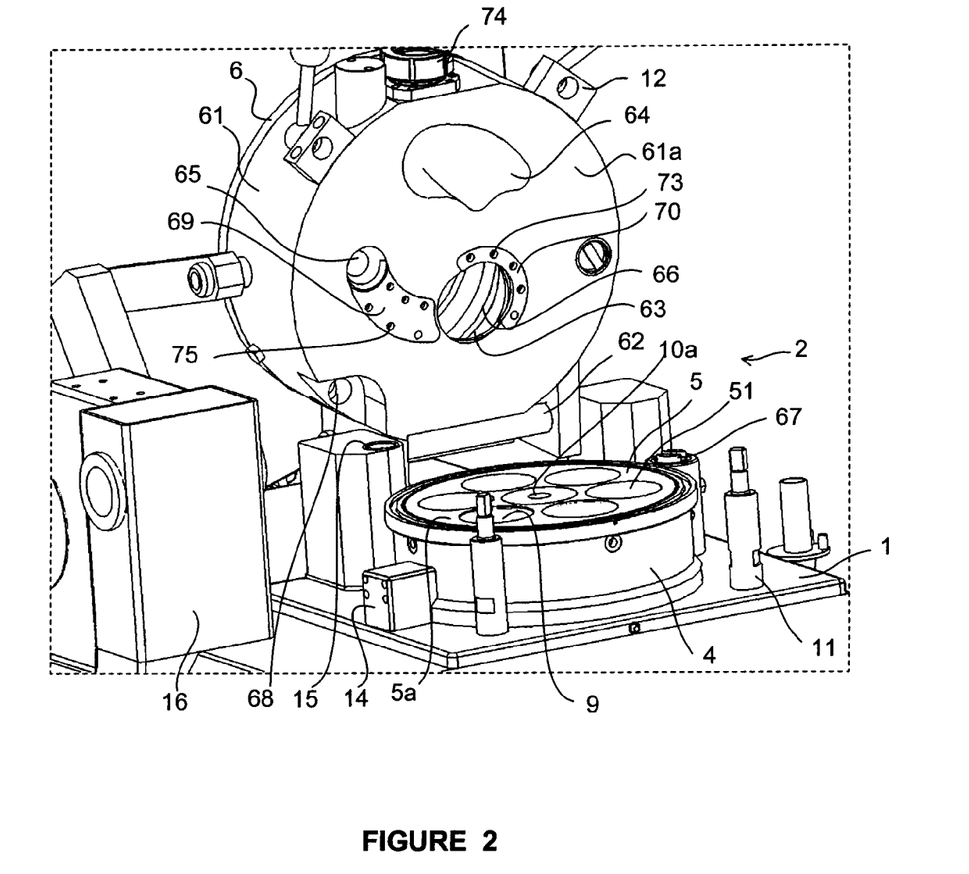
FIG. 2 shows a perspective view of the upper part of the pump, with the lid therewith in open position.
Figure 7:
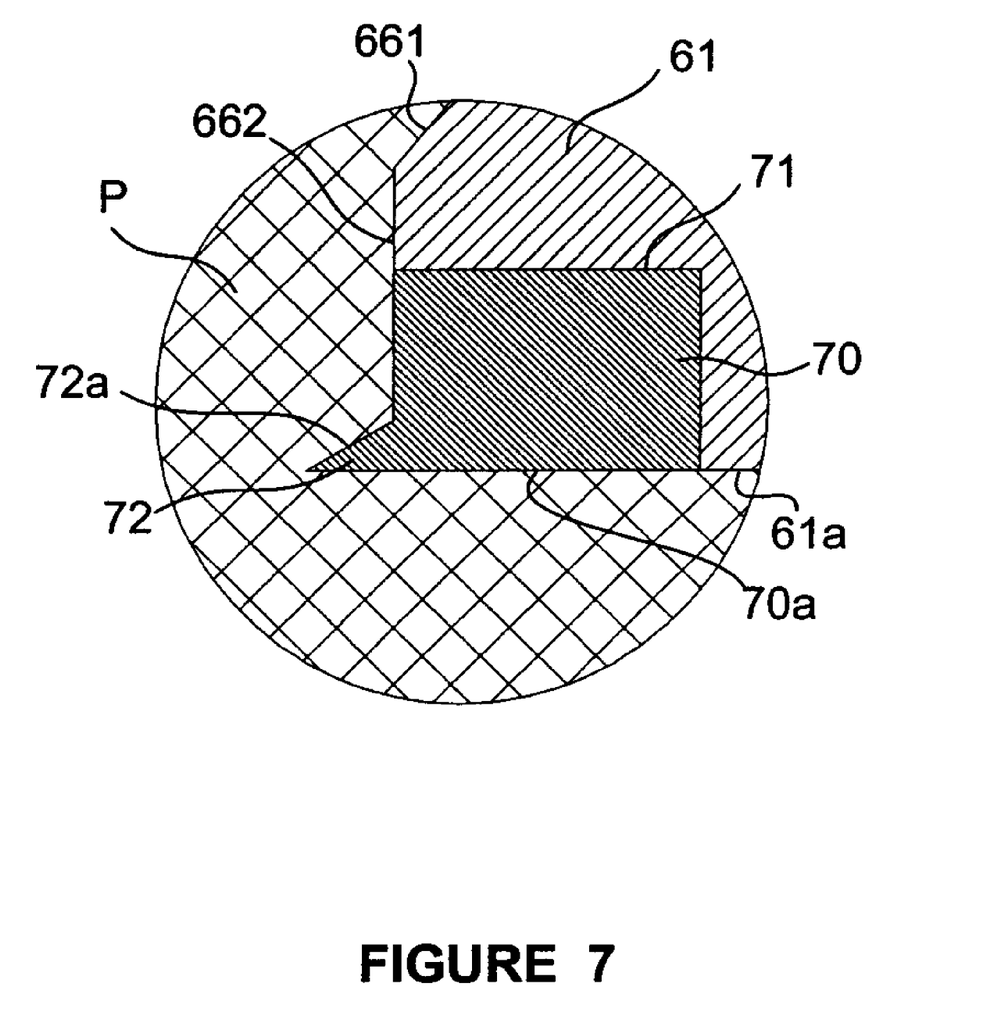

The feeding orifice is equipped on the downstream end with planar blade 70, generally in an arc of circle. As can be seen better in FIG. 7, the blade is mounted in a recession 71 of the lid, in such a way that its external side 70a flushes the internal surface 61a of the lid, cutting edge 72 of the blade jutting out in relation to the wall of feeding channel 66. When the lid is in closed position, the blade comes flat against the barrel by its external side 70a, bevel 72a of the cutting edge therewith being oriented in the direction that is opposite to the barrel. In the example shown, the wall of the feeding duct 66 includes a tapered portion 661 extended by a portion of cylindrical output 662 defining the feeding orifice of the lid, with the receiving recession 71 of the blade being formed in this cylindrical output portion. As can be seen in FIG. 2, the blade extends over an arc of approximately 180° and is mounted in a removable way in the recession, for example by means of screw 73, in order to allow for replacing or sharpening therewith.

Discharging orifice 64 of elongated form is in communication with a lateral extrusion head 74, and is placed and conformed in such a way that at least two cylindrical chambers are continuously in communication with it. The orifice has a main part 641 (FIG. 3) of a generally circular form centred on a piston in position E, which extends from downstream to upstream in relation to the direction of rotation of the barrel for a secondary part 642 of a depth that is less than that of the main part having a downstream concave end 642a.

Figure 5:
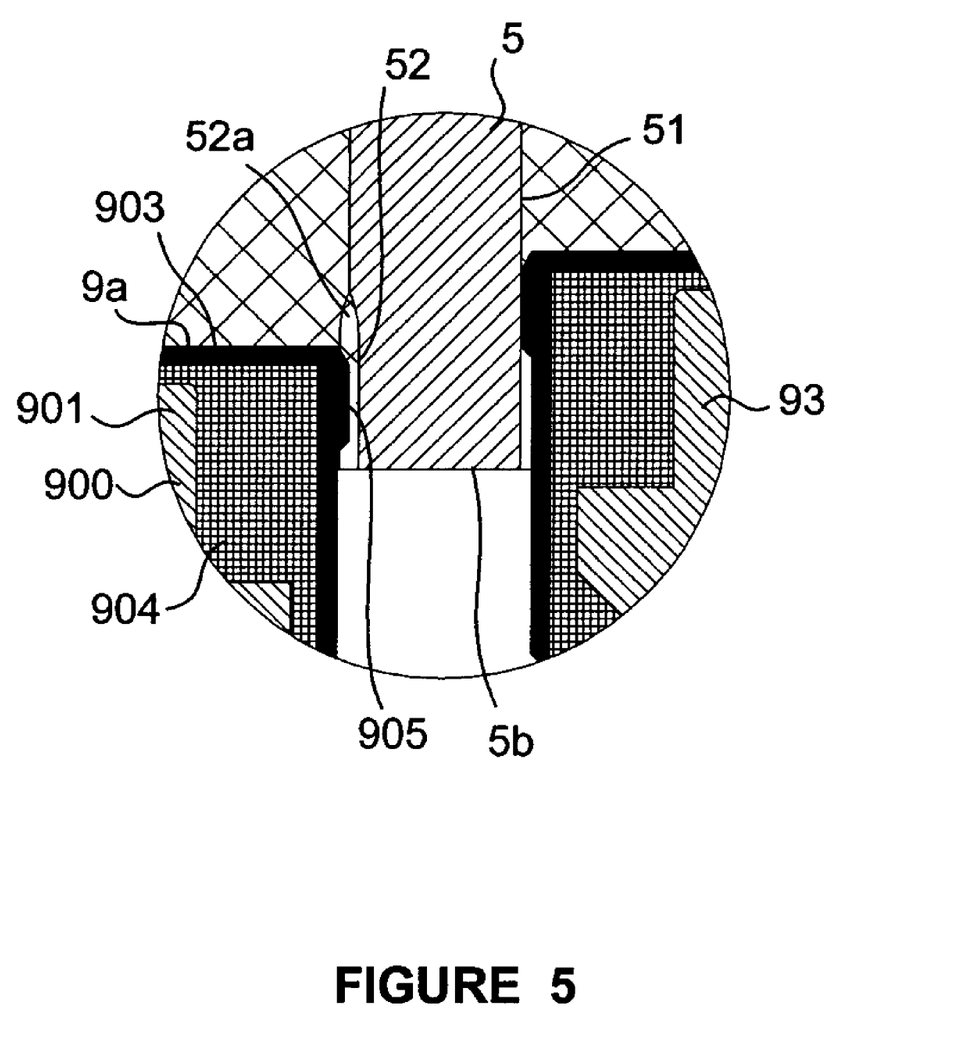
Figure 6:
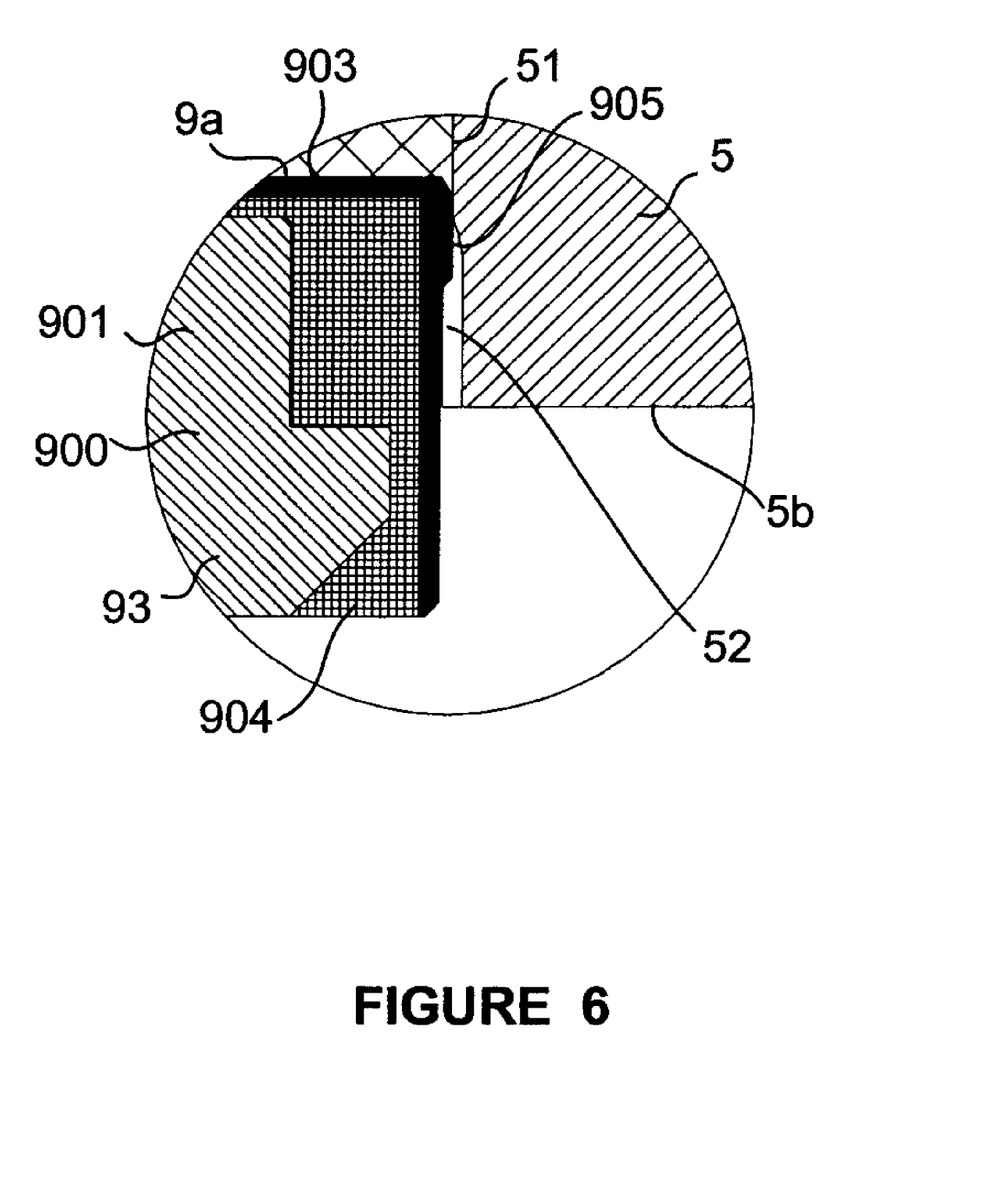

For the vacuuming of the cylindrical chambers, each bore 51 includes three vertical grooves 52, of substantially semi-circular transversal section, each positioned 120° from each other and opening into the lower side 5b of the barrel. As can be seen in FIGS. 4 and 5, the height of the vertical grooves and the travel of the pistons are defined in such a way that the upper end 52a of each vertical groove is positioned beyond the upper side 9a of the pistons in their low position in order to place the cylindrical chambers of the barrel in communication with the lower chamber of the stator defined under the barrel. This lower chamber is continuously under vacuum when the stuffer is running by the intermediary of a vacuum pump. Vacuum pump 13 (FIG. 1) is for example placed on the chassis and is connected to the lower chamber of the stator via a first suction passage, extending in a compressor enclosure 14, and connected to a radial piercing of the cylindrical wall of the casing. As can be better seen in FIG. 6, in the aforementioned intermediary low position of the pistons, the upper side of the piston comes to position itself above the vertical grooves in order to suppress the suction by the latter.

Each piston head 900 includes a metallic body 901 by which the head is mounted at the end of piston rod 902, a packing or cap 903 covering said body, made from a material of the PTFE type, by inserting an intermediary layer 904 of an elastic material, such as an elastomer of the silicone type. The cap includes an upper circular wall continuing on in an annular wall, this latter being equipped with a flange 905 defining the sealing surface through which the piston comes into sliding contact with the cylindrical wall of the bore. For better holding over time of the sealing surface, the flange has a generally trapezoidal transversal section, with the sealing surface being connected to the upper circular wall by a chamfer. More preferably, the vertical grooves diminish progressively in the upper part, with the upper ends having a semi-tapered transversal section.

By way of numerical example, each vertical groove extends over a height of approximately 8 millimetres (mm), flange 905 has a height of approximately 4 mm, the travel of a piston between its high position and its low position is approximately 55 mm, and it travel between its low positions and its intermediary low position of approximately 5 mm.

Aforementioned vacuuming orifice 65 of the lid opens into a channel extending laterally and whose input 68 comes into communication, when the lid closes, with a second suction passage 15 of the vacuum pump mounted on chassis 1. The vacuuming orifice is positioned downstream of the feeding orifice in relation to the direction of rotation F of the barrel, so as to be substantially opposite the piston in position A. The internal side 61a is equipped with one or more grooves 69 connecting to the vacuuming orifice. The arc over which extends the groove(s) is determined in such a way that each cylindrical chamber moves from said vacuuming orifice until the feeding orifice is in a vacuum. The groove(s) are formed by one or more plates mounted in a removable way, for example screws, in a recession of the lid in order to adapt the type and the number of grooves to the degree of desired suction. This vacuuming via vertical grooves 52 and vacuuming orifice 65 provides the substantially uniform filling by suction of the cylindrical chambers with product P coming from the hopper.

Figure 3:
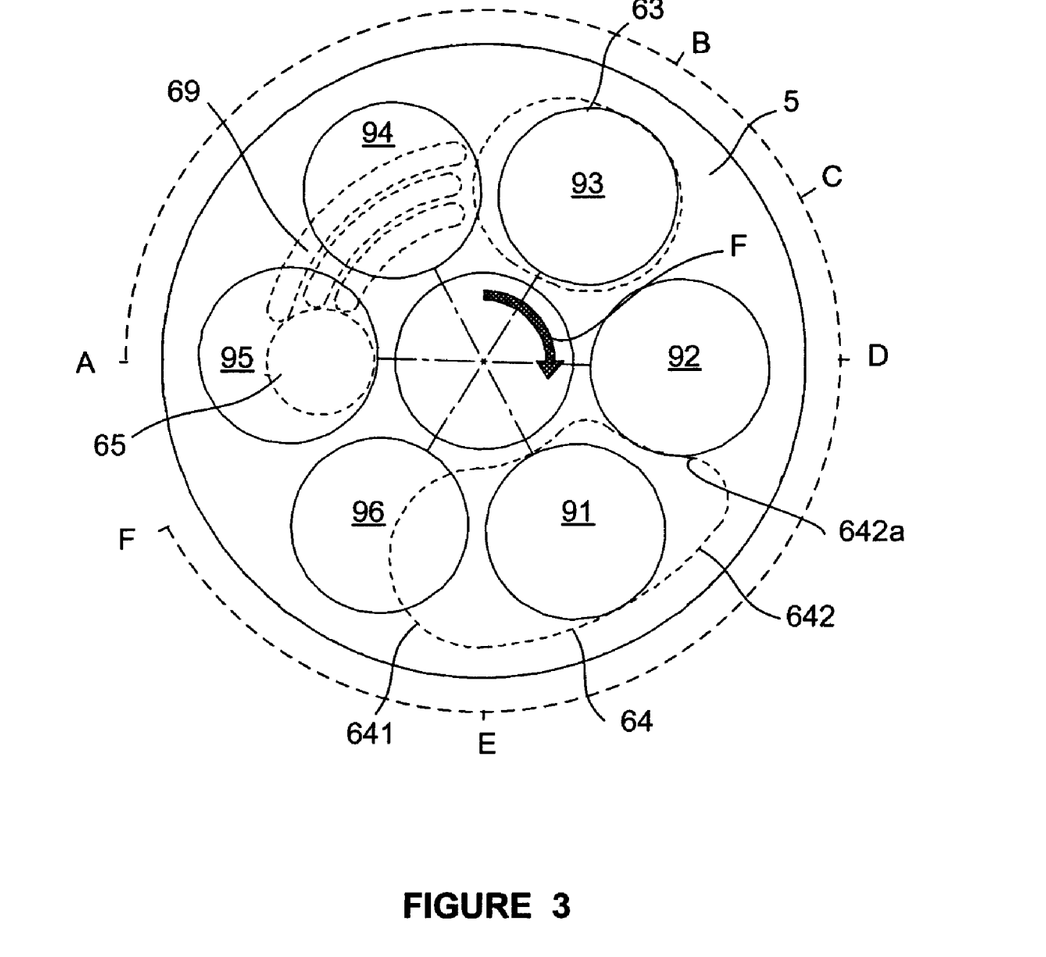
FIG. 3 shows a schematic view of the top of the barrel of the pump.
Figure 4:
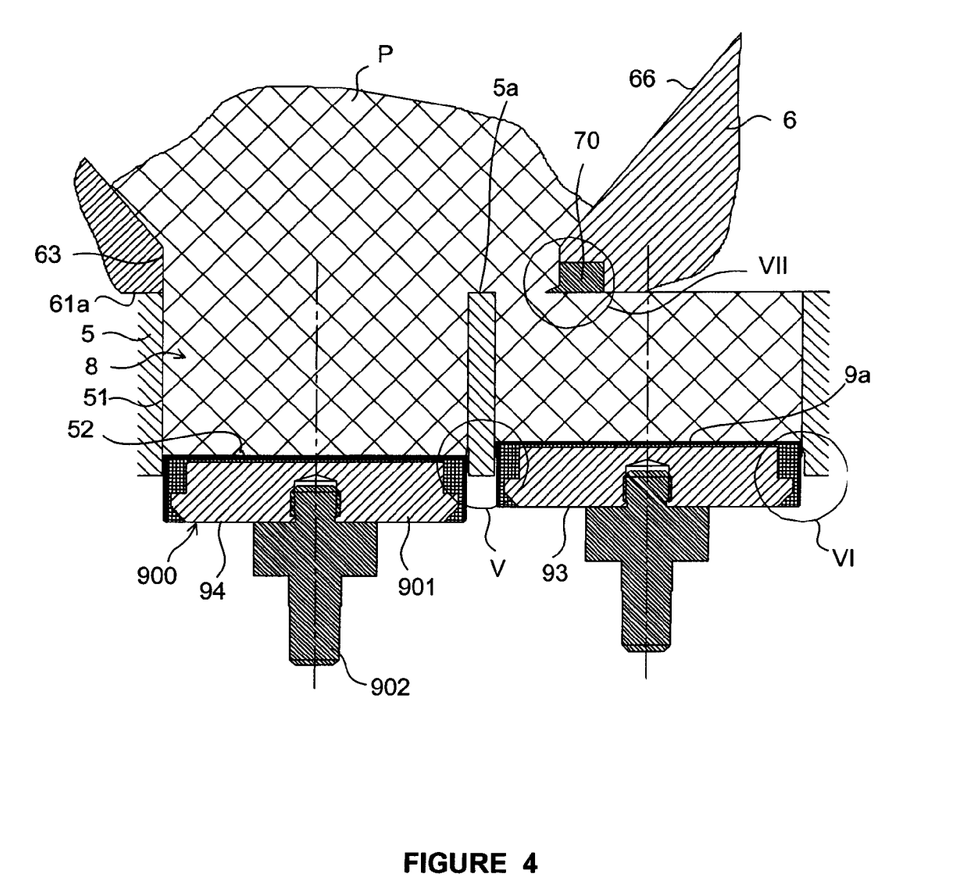
FIG. 4 shows a partial cross-section longitudinal view of the barrel in FIG. 3 showing the positions of two adjacent pistons in their respective cylindrical chambers, one in low position, the other in intermediate low position; and, FIGS. 5, 6 and 7 show enlarged views respectively of details V, VI and VII in FIG. 4.

A detailed description of the operation of the pump, and in particular of the filling of the cylindrical chambers shall now be carried out in reference to FIGS. 3 and 4. In the position of the barrel shown in FIG. 3, piston referenced 92 is in position C, just before the upstream end 642a of the discharging orifice. This piston 92 is in intermediate low position, and is ready to begin its ascending discharge phase. Piston 91 is in ascending phase, opposite the discharging orifice. Piston 96 is partially opposite the discharging orifice, but in high position, and shall be maintained in this high position as long as it is in communication with the discharging orifice. Only piston 91 discharges the product, such as minced meat, into the discharging orifice. Piston referenced 95 is in the aforementioned angular position A, in low position and opposite the vacuuming orifice. The cylindrical chamber associated with this piston is vacuumed by the vertical grooves as well as by the vacuuming orifice. Piston 94 is also in low position, opposite vacuuming grooves 69, and begins its filling phase opposite the feeding orifice. As soon as the cylindrical chamber associated to piston 94 comes into communication with the feeding orifice, product P begins to penetrate into the cylindrical chamber under the effect of the suction obtained by the vacuuming orifice via the grooves and the vertical grooves. Suction from the bottom by the intermediary of the vertical grooves provides good filling of the lower part of the cylindrical chamber, avoiding the formation of empty spaces, the minced meat coming flat against the upper surface of the pistons. Piston 93 is angular position B is opposite the feeding orifice, with the filling of the associated cylindrical chamber completed.

During the rotation of the barrel from the position shown in FIG. 3, the filling of the cylindrical chamber associated to piston 94 continues. Once the lower part of the cylindrical chamber is full, only suction from the top favours filling the cylindrical chamber. The cylindrical chamber associated to piston 93 moves away progressively beyond the downstream end of the feeding orifice. During this movement any pieces of muscle that extend from the cylindrical chamber are cut by blade 70. When piston 93 arrives at angular position C, the piston is moved upwards by the mechanical cam in its intermediary low position shown in FIG. 4, wherein flange 905 of the piston comes to block off the vertical grooves in order to suppress the suction from the bottom. The piston is maintained in intermediary low position until angular position D. The switch to an intermediary position before the beginning of the ascending discharge phase of the pistons makes it possible to avoid the suction from the bottom from altering the flow of the piston at the beginning of discharge. The switch to intermediary low position is carried out when the cylindrical chamber is still in communication with the feeding orifice in order to avoid compressing the minced meat contained in the cylindrical chamber and discharge a small portion of it towards the feeding orifice. Starting at position D, the piston begins its ascending phase in communication with the discharging orifice, the flow therewith cumulating with that of the piston positioned upstream.

The pump according to the invention can be used for producing a continuous sausage with which sausages will be realised, or for the portioning for example of minced meat comprising large pieces of muscle, with the barrel being drawn into rotation discontinuously.

Although the invention has been described in connection with a particular embodiment, it is evident that it is in no way limited to this and that it includes all of the technical equivalents of the means described as well as combinations of them if the latter enter within the scope of the invention. In another embodiment the vacuuming of the cylindrical chambers from the bottom is obtained by vertical channels connecting to the upper side of the pistons. Mobile inserts mounted in said channels can therefore be provided in order to block off said channels in the intermediary low position of the pistons.

What is claimed is:

1. Rotary piston pump for semi-solid products, in particular for minced meat, comprising:
    a stator (4) defining a cylindrical cavity,
    a rotor or barrel (5) housed in said cylindrical cavity, able to be driven in rotation by a motor (10), said rotor comprising an array of bores (51) spaced circumferentially, wherein pistons (9) are mounted,
    a mechanical cam cooperating with the pistons in order to provoke during the rotation of the barrel an alternating back and forth movement of said pistons between a low position and a high position,
    a lid (6) closing the cylindrical cavity,
    a feeding orifice (63) coming into communication with at least one cylindrical chamber formed by the barrel cylindrical bore and a piston associated therewith, and intended to be in communication with a hopper (3),
    a discharging orifice (64) able to come simultaneously in communication with at least two consecutive cylindrical chambers,
    and vacuuming means for vacuuming cylindrical chambers (8) for filling thereof,
    characterised in that said vacuuming means include at least one vacuuming channel (52) connecting to the lower part of each cylindrical chamber, said vacuuming means being able to vacuum by the bottom each cylindrical chamber by the vacuuming channel therewith when the piston associated therewith is in lower position.

2. Pump according to claim 1, characterised in that said vacuuming means are able to stop the vacuuming of each cylindrical chamber (8) by the vacuuming channel therewith (52) prior to the moving of said cylindrical chamber opposite the discharging orifice (64).

3. Pump according to claim 1, characterised in that each cylindrical chamber (8) includes at least one vacuuming channel (52) formed on the cylindrical wall of the bore (51).

4. Pump according to claim 3, characterised in that each vacuuming channel is formed by a vertical groove (52) placed on the cylindrical wall of the bore (51), said groove extending from lower side (5b) of the barrel over a height that is sufficient to connect to the cylindrical chamber (8) when piston (9) is in low position, said vacuuming means being able to vacuum the lower chamber of stator (4) on which said vertical grooves connect.

5. Pump according to claim 4, characterised in that each piston (9) is able to be moved by the mechanical cam from its low position towards an intermediary low position wherein the piston blocks off said vacuuming channel(s) (52), with the movement being carried out upstream from the discharging orifice (64), when said piston is located at least partially opposite feeding orifice (63).

6. Pump according to claim 1, characterised in that each cylindrical chamber (8) includes at least two vacuuming channels (52) distributed at a regular angular interval.

7. Pump according to claim 1, characterised in that each piston (9) includes a piston head (900) connected to a piston rod (902), said head comprising a body (903) covered with a packing (904) made from a material having sliding properties, by inserting between the body and said packing an intermediary layer (905) having elastic properties, said packing forming a sealing surface through which piston (9) comes into sliding contact, in a substantially sealed manner, against the cylindrical wall of the bore (51).

8. Pump according to claim 1, characterised in that vacuuming means further comprises a vacuuming orifice (65) for vacuuming the chambers from the top, said pump comprising a vacuum pump system (13) to which are connected vacuuming channels (52) of the cylindrical chambers, as well as said vacuuming orifice (65).

9. Pump according to claim 1, characterised in that the cylindrical chambers (8) are positioned axially, pistons (9) able to be moved in parallel to the axis of rotation of the barrel, said lid (6) being equipped with the feeding orifice (63) and the discharging orifice (64).

10. Pump according to claim 1, characterised in that it further comprises cutting means, comprising a blade (70) positioned along the downstream edge of the feeding orifice (63), in order to cut the pieces of products protruding from the cylindrical chambers during their passage beyond the feeding orifice.

11. Rotary piston pump for semi-solid products, in particular for minced meat, comprising:
    a stator (4) defining a cylindrical cavity,
    a rotor or barrel (5) housed in said cylindrical cavity, able to be driven in rotation by a motor (10), said rotor comprising an array of bores (51) spaced circumferentially, wherein pistons (9) are mounted,
    a mechanical cam cooperating with the pistons in order to provoke during the rotation of the barrel an alternating back and forth movement of said pistons between a low position and a high position,
    a lid (6) closing the cylindrical cavity,
    a feeding orifice (63) coming into communication with at least one cylindrical chamber formed by the barrel cylindrical bore and a piston associated therewith, and intended to be in communication with a hopper (3),
    a discharging orifice (64) able to come simultaneously in communication with at least two consecutive cylindrical chambers, and vacuuming means for vacuuming cylindrical chambers (8) for filling thereof,
    characterised in that it further comprises cutting means, comprising a blade (70) positioned along the downstream edge of the feeding orifice (63), in order to cut the pieces of products protruding from the cylindrical chambers during their passage beyond the feeding orifice.

* * * * *